July 28, 1964

D. SILVERMAN ETAL 3,142,750

SEISMIC ANALOG RECORD COMPUTER

Filed June 29, 1960

CHARLES F. HADLEY
DANIEL SILVERMAN
*INVENTORS.*

BY *Newell Potter*

*ATTORNEY*

July 28, 1964     D. SILVERMAN ETAL     3,142,750
SEISMIC ANALOG RECORD COMPUTER
Filed June 29, 1960                                  6 Sheets-Sheet 2

CHARLES F. HADLEY
DANIEL SILVERMAN
*INVENTORS.*

BY *Newell Pottoff*

ATTORNEY

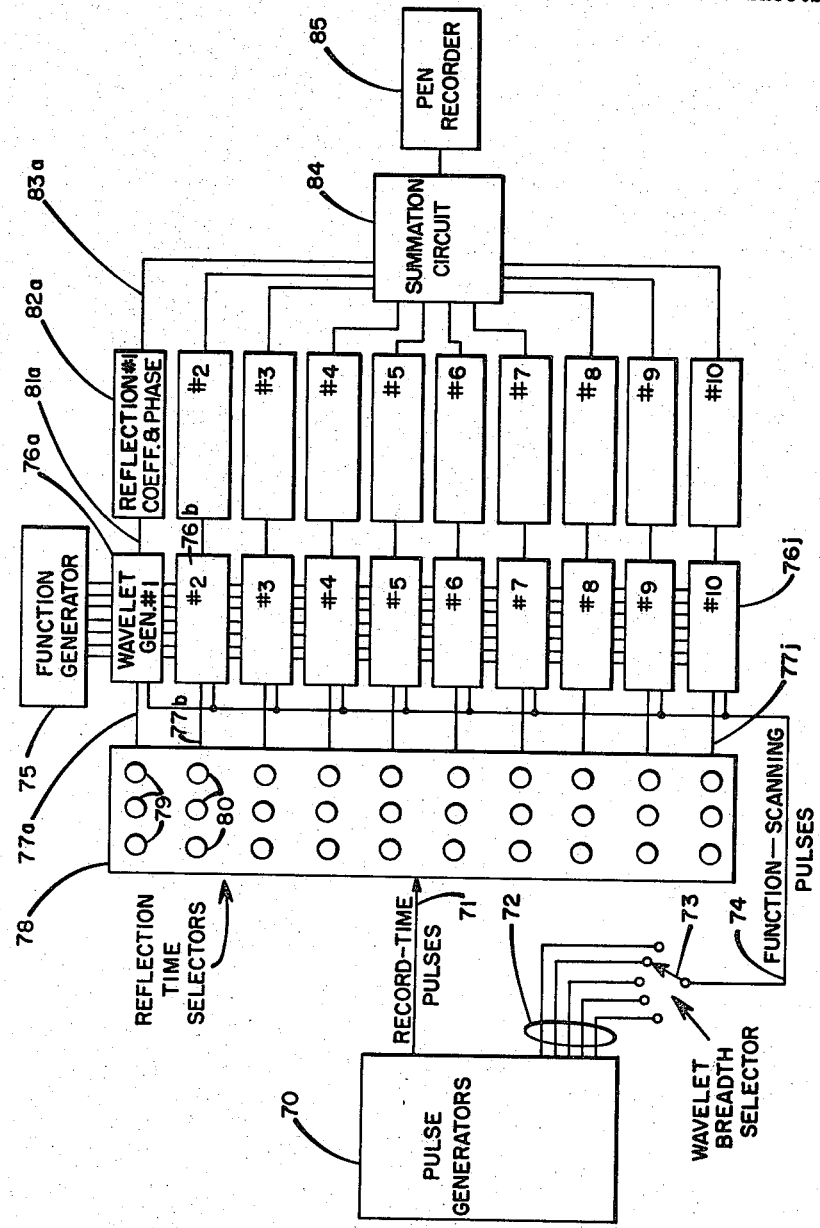

July 28, 1964

D. SILVERMAN ETAL 3,142,750

SEISMIC ANALOG RECORD COMPUTER

Filed June 29, 1960

CHARLES F. HADLEY
DANIEL SILVERMAN
INVENTORS.

BY Newell Potter

ATTORNEY

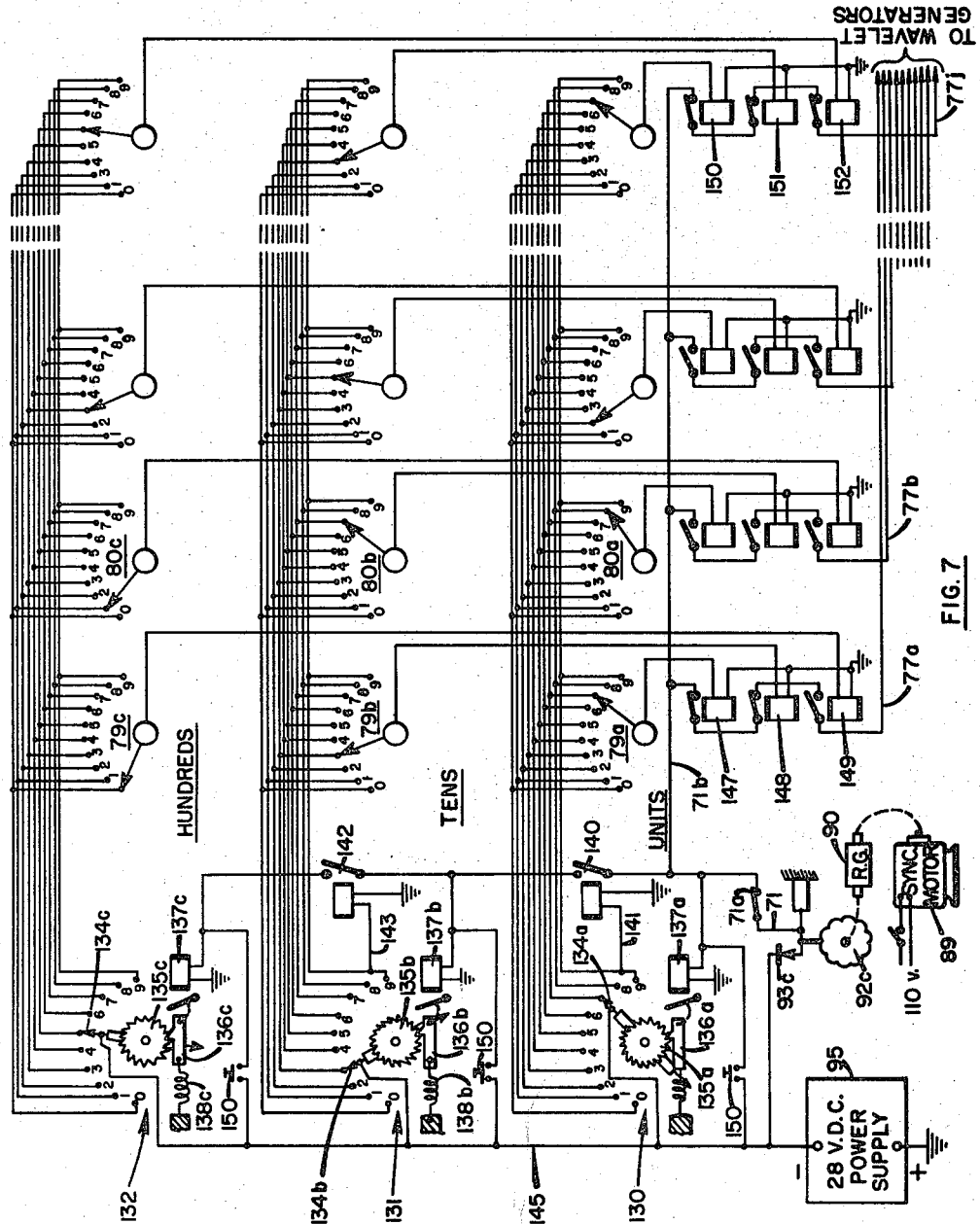

July 28, 1964  D. SILVERMAN ETAL  3,142,750
SEISMIC ANALOG RECORD COMPUTER
Filed June 29, 1960  6 Sheets-Sheet 6

CHARLES F. HADLEY
DANIEL SILVERMAN
*INVENTORS.*

BY *Newell Pottorf*

*ATTORNEY*

United States Patent Office 3,142,750
Patented July 28, 1964

3,142,750
SEISMIC ANALOG RECORD COMPUTER
Daniel Silverman and Charles F. Hadley, Tulsa, Okla., assignors to Pan American Petroleum Corporation, Tulsa, Okla., a corporation of Delaware
Filed June 29, 1960, Ser. No. 39,696
11 Claims. (Cl. 235—184)

This invention relates to seismic geophysical surveying and is directed particularly to a method and apparatus for computing synthetic seismic record traces. More particularly, the invention is directed to an analog system by which synthetic seismic traces or records can be quickly and accurately computed for any measured or assumed sequence of subsurface reflecting interfaces.

Seismic geophysical surveying, as it has been carried out through the years in exploration for oil an gas, has been chiefly concerned with finding the travel times to prominent subsurface reflecting interfaces and converting these travel times to contour maps or cross-sections showing the variations in depth of the interfaces of interest within a prospecting area. The character or form of the received waves has been considered as only of secondary importance despite the fact that it too has been observed to vary extensively over a prospecting area.

More recently, it has been shown that the prominent wave-forms observed on seismic field records are frequently due to the interaction or combining of several reflected seismic wavelets from each of a series of closely spaced reflecting interfaces. Since these wavelets so nearly completely overlap, however, what may be a major variation in one of the interfaces may appear only as a minor change in character of the total waveform. Nevertheless, the fact that a subsurface variation is shown by a change in the reflected wave-form leads to the hope that a sufficiently careful study of the minor changes in received wave-form can be interpreted so as to show what the actual subsurface variation is.

A valuable tool for use in making this interpretation is the synthetic seismic trace or record. One system for making such records is that described by R. A. Peterson et al. in Geophysics, volume XX, pages 516 to 538. Basically, this system starts with a well log of seismic-wave velocities as a function of depth and utilizes the log for superimposing seismic impulses reflected at all interfaces shown by the log with the proper relative timing, amplitude, and phase. Comparisons between the lithology, the log, the synthetic trace so generated, and a seismic field-record trace made at the well location then generally show how the various characteristic parts of the seismic field-record trace are related to the subsurface lithology. In the interpretation of seismic field records made at other locations in the area, the departures from the log data needed to produce a satisfactory match between the field records and corresponding synthetic traces are considered to suggest the possible lithologic changes that exist.

While there are several known methods and devices for producing such synthetic record traces, most of them suffer from the drawback that they are somewhat expensive and time-consuming to utilize. Accordingly, synthetic seismic records or traces are used much less often than they would be if they could be quickly, simply, and cheaply prepared.

In view of the foregoing, it is a primary object of this invention to provide a novel method and apparatus for quickly, simply, and cheaply preparing synthetic seismic record traces. It is a further object of the invention to provide a novel method and apparatus for generating synthetic seismic record traces in which all of the principal variables of reflection time, reflection coefficient and phase, and input wavelet form and breadth may be individually and rapidly evaluated. A still further object is to provide a seismic analog record computer which is highly reliable in operation and employs a minimum of electronic circuits. A still further object is to provide such a computer which operates at a time scale sufficiently greater than the actual scale of seismic reflection times to permit accurate recording by such means as a pen recorder. Other and further objects, uses, and advantages of the invention will become apparent as the description proceeds.

Briefly stated, the foregoing and other objects are accomplished in accordance with the invention by providing a wavelet generator on which the wave-form of the seismic impulse is present as an electric voltage variation along the length of the generator element. This generator element may be either in the form of an electrical resistance or a multiple-position stepping switch or relay. Contactors separated in proportional space or time in accordance with the physical spacing or time separation of subsurface interfaces scan across the wave-generating element, and each reproduces the voltage function present thereon. The voltage-function output of each contactor is adjusted in amplitude in accordance with the reflection coefficient of the corresponding subsurface interface and is added to the corresponding voltage functions of all other contactors, taking account of the reflection phase. The sum of all of these voltages is then recorded as a function of time or distance along a record strip, preferably by a pen-recording voltmeter or the like.

In accordance with one embodiment of our invention, the contactors remain stationary at spaced locations along a scale, in proportion to the relative reflection times. The wave-form of the reflection is provided by a resistance wire wound in a particular way upon a card form. Scanning this wavelet card past the various stationary contactors introduces the wave-worm into the circuit network in proper time sequence to approximate the seismic reflections at corresponding subsurface interfaces.

In accordance with another and preferred embodiment, the waveform is present at the stationary contacts of a plurality of multi-contact stepping switches, one for each interface. Each wavelet is reproduced by scanning the movable contactor arm across the corresponding contact array and appropriately modified in amplitude and phase. Means are provided in both embodiments for varying the effective wavelet breadth, either by a change in the contactor scanning rate or in the voltage distribution along the wavelet card.

This will be better understood by reference to the accompanying drawings forming a part of this application and illustrating certain typical and preferred embodiments of the invention. In these drawings, FIGURE 1 is a schematic wiring diagram, partly in block form, of one embodiment of the invention;

FIGURE 4 is a block wiring diagram of a preferred embodiment of the invention;

FIGURE 7 is a detailed wiring diagram of the reflection-time portion of the apparatus of FIGURE 4;

Figure 1:
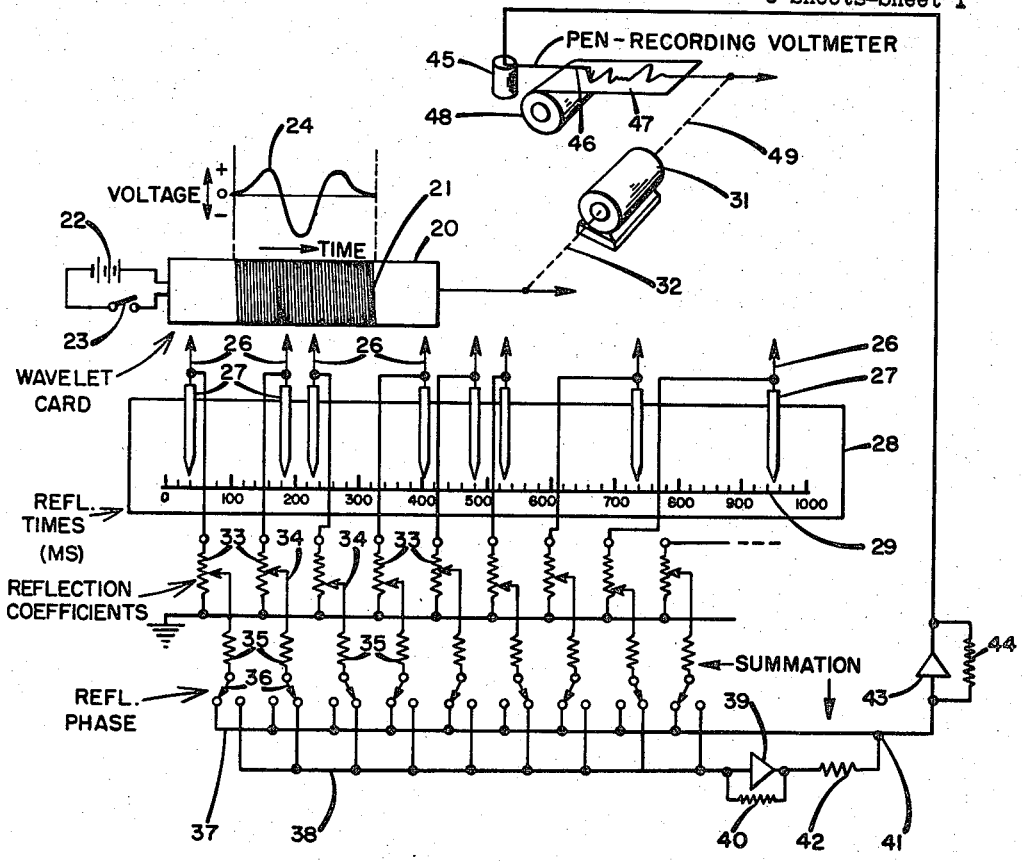

Referring now to these drawings in detail and particularly to FIGURE 1 thereof, in this figure is shown a wavelet card 20 bearing an electrical resistance winding 21, connected in a network with a voltage source or battery 22 in series with a single-pole switch 23. When the switch 23 is closed, the voltage measured by a contactor moving along and successively contacting the windings of resistance 21 takes the form of the curve 24. Adapted to contact the winding 21 of card 20 are a plurality of contactors 26, each mounted on an insulated carrier 27, adapted to be spaced along and supported by a base member 28, carrying a reflection time scale 29 marked thereon. Each of the contactor carriers 27 may be positioned with respect to the scale 29 at any position along the length of the support 28. Each contactor 26 is connected to a grounded potentiometer 33 having a movable contact arm 34 by which any fraction of the voltage applied from the contactor 26 to the potentiometer 33 is derived. Each potentiometer 33 with its associated contactor 34 is preferably provided with a scale (not shown) corresponding to the numerical value of the reflection coefficient of a particular subsurface interface which the position of the contactor carrier 27 along the time scale 29 simulates as to reflection time.

Each potentiometer contactor 34 is connected through a series, isolating resistance 35 to the movable arm of two-position switch 36, which provides for determining the phase of the corresponding reflection. One set of the two positions of the switches 36 is connected to a common lead 37, while the other is connected to a common lead 38. The lead 37 is connected to a junction point 41, while the lead 38 is connected through an operational amplifier 39 connected through a resistor 42 to the junction point 41. A feedback resistor 40 stabilizes amplifier 39 and reduces its gain at point 41 substantially to unity. It is the function of the amplifier 39 to invert the voltages applied thereto with respect to those appearing on the lead 37, so that both positive and negative reflection phases may be simultaneously summed. The voltage appearing at the junction point 41 is amplified by an amplifier 43, stabilized by the feedback resistor 44, and applied to a pen recorder 45 driving a recording pen 46 in contact with a record strip 47. An electric motor 31 moving the wavelet card 20 by a driving connection 32 preferably also drives the strip 47 from a supply spool 48 by a driving connection 49.

In operation, each of the contactor supports 27 is positioned at a time point along the scale 29 corresponding to the two-way seismic-wave travel time to one of a succession of subsurface reflecting interfaces. Each potentiometer contactor 34 is adjusted to match the reflection coefficient of the corresponding interface, and the reflection phase switch 36 in series with each particular contactor 34 is thrown to either the positive or negative phase position in accordance with the subsurface data showing whether the acoustic impedance increases or decreases in the downward crossing of the interface. Next, the switch 23 is closed to energize the winding 21 of wavelet card 20, and the latter card, starting from a position to the left of the zero of scale 29 is traversed at uniform speed past the contactors 26 from left to right. As each contactor 26 contacts the winding 21, the predetermined amplitude and phase of the voltage derived therefrom is transmitted to the appropriate lead 37 or 38 and thereby summed with the voltages of other contactors 26 at the point 41. Accordingly, the recording pen 46 draws on chart 47 a line which shows at any instant the sum of the voltages, with proper relative times, amplitudes, and phases, of all contactors 26 simultaneously making contact with the wavelet card 20. This is exactly analogous to the manner in which the various pulse wave-forms in seismic surveying superimpose when the pulse duration times its velocity of travel is greater than the interface separations so that the pulse spans several reflecting interfaces.

Figure 2:
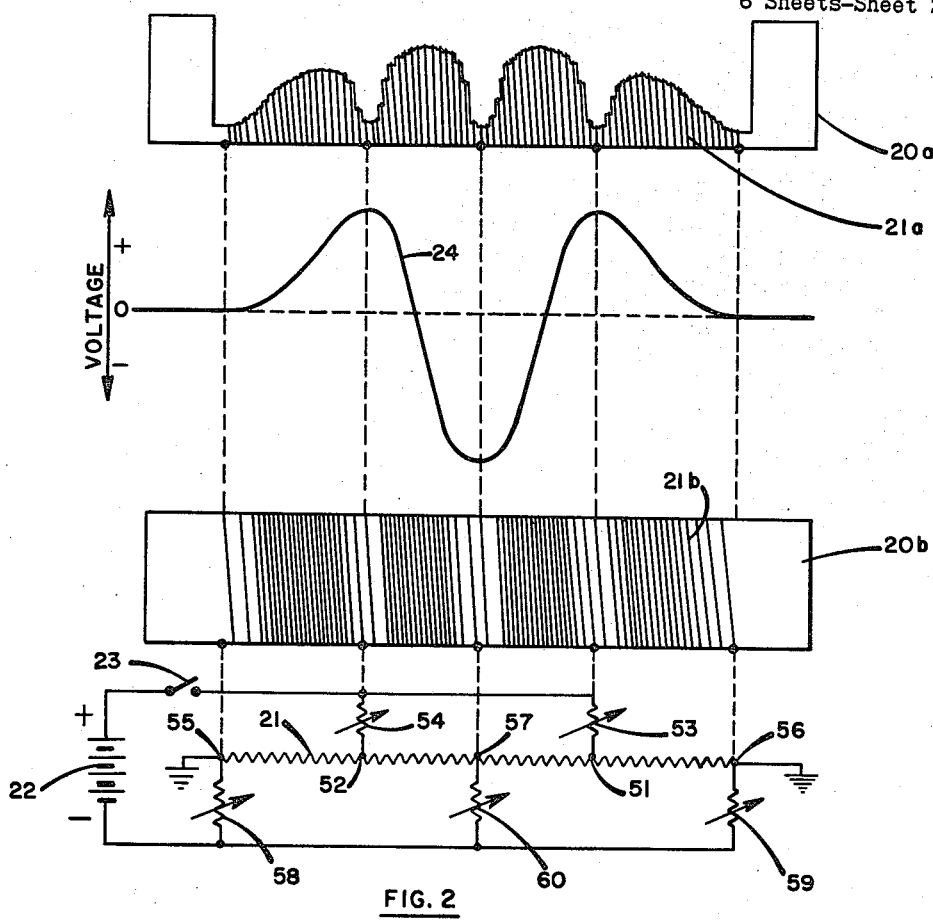
FIGURE 2 shows graphically and diagrammatically, as well by a wiring diagram, the construction of typical wavelet cards for use in the apparatus of FIGURE 1.

In FIGURE 2, correlated in position with an enlarged graph 24 of one wavelet form commonly used in this apparatus, are two forms of the wavelet card 20. Thus, as is shown by the upper wavelet card 20a, the resistance-wire winding 21a may be relatively uniformly spaced with varying length of the turns along the length of the card as shown by the figure, in order to produce the voltage function 24. Alternatively, the same voltage function can be provided by a card 20b of approximately uniform width on which the winding 21b of resistance wire is non-uniformly spaced. By varying this spacing somewhat in the manner shown and applying positive and negative voltages to various points along the length of the winding, the desired wave-form can be achieved.

This is shown at the bottom of the figure by the wiring diagram which is correlated in position with the other portions of this figure. Thus, the positive terminal of battery 22 is connected to the resistance 21 at the points 51 and 52, respectively, through the adjustable resistances 53 and 54. Similarly, the negative pole of the battery 22 is connected to the ends 55 and 56 and to the center point 57 of resistance 21 through the respective adjustable resistances 58, 59, and 60. In addition, the points 55 and 56 may be connected to ground. By proper adjustment of the various adjustable resistors, the heights of the two positive peaks coinciding with the input points 51 and 52 can be set to any desired magnitude and made equal or unequal to each other as desired. Similarly, the current flow to the midpoint 57 through the resistance 60 determines the depth of the central trough of the wave-form. By grounding points 55 and 56, it is insured that such points will be at zero potential. Thus, the voltage obtained by a contactor traversing the edge of the card 20a or 20b takes the form of the wave 24 shown in this figure.

The effective wavelet breadth, that is the time interval occupied by the span of the wavelet card 20 in terms of the travel-time along scale 29 can be varied in at least two different ways: by changing the scale while keeping the card constant, or vice versa. For example, a different scale 29 can be attached to the support 28 and the various contactor holders 27 repositioned to the same series of two-way travel times in accordance with the new scale. If this new scale is compressed with respect to the scale 29, so as to include a greater range of reflection times, this is equivalent to broadening the wavelet 24. Conversely, if the new scale is expanded, so as to cover a shorter range of reflection times than the scale 29 shown, this is equivalent to a narrowing of the width of wavelet 24, so that by these scale changes with respect to the fixed length of the resistance 21 on the card 20, the effect of various wavelet breadths can be investigated.

Figure 3:
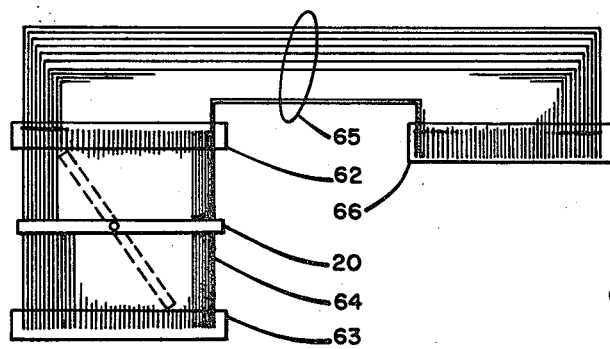
FIGURE 3 shows an alternative form of wavelet generator with means for varying the wavelet breadth.

A preferred manner of varying the wavelet breadth is illustrated in FIGURE 3. Stretched between a pair of insulated supporting members 62 and 63 are a large number of parallel wires 64 closely spaced but insulated from each other. Each of the wires 64 is connected by a separate lead in a flexible cable 65 to the contact card 66 which performs the same function as the wavelet card 20 in being movable past the ends of contactors 26. The edge of the wavelet card 20 in this instance is pressed against and makes contact with each wire of the array of wires 64. When card 20 is in the position shown in solid lines, extending transversely across the wires 64, the maximum number of wires transfers voltage from a corresponding number of points of the winding of card 20 to the corresponding wire positions on the contact card 66. By rotating the card 20 about its axis in the manner suggested by the dotted-line position of the card, any lesser number of the total group of wires 64 can be energized from the edge of the winding 21. This accordingly shortens the length along the card 66 upon which the complete wave-form 24 of the card 20 appears and corresponds to a narrowing of the pulse. Thus, a rapid and convenient means is provided for changing the effective length of the impulse applied to the various contactors 26 without requiring any alteration in their setting according to a new scale 29.

In FIGURES 4 to 8 inclusive is shown a preferred embodiment of this invention. Thus, in the block wiring diagram of FIGURE 4, a plurality of pulse generators 70 supply electric pulses at a number of different but synchronized or related frequencies. One of these frequencies, preferably an intermediate value, is considered the clock or record-time frequency and is transmitted from the generator 70 over an output lead 71. Each of the multiple frequencies, which may include the record-time frequency, is respectively transmitted over one of a group of leads 72 to one of the contact points of a multiple-contact selector switch 73. In a manner which will be later described the switch 73 serves as a wavelet-breadth selector. One of these pulse frequencies, as determined by the arm position of the selector 73, is transmitted over the lead 74 to each of an array of wavelet generators.

In the embodiment shown in FIGURE 4, provision is made for the modeling of ten reflecting interfaces at a time. An input wavelet function analogous to the voltage variation along the resistance 21 is provided by a master function generator 75 appropriately connected to each of the plurality of (in this case ten) wavelet generators 76. Also connected to each of the wavelet generators 76 is a lead 77 from the reflection-time selector panel 78 upon which the two-way travel time in milliseconds to each of ten different reflecting interfaces can be set by decade dials. For example, each group of three dials is set to the two-way travel-time in milliseconds to one of the ten different reflecting interfaces to be modeled. For example, the three decade dials 79 are set to the two-way travel-time in milliseconds for interface #1, the three dials 80 for the travel-time in milliseconds to interface #2, and so on.

By the lead 71 the record-time pulses, each pulse corresponding to one millisecond of record time, are also introduced into the reflection-time-selecting circuits 78. It is the function of each of these circuits to transmit over its output lead 77 to the corresponding one of wavelet generators 76 an impulse at the exact record time set on the decade dials. For example, when the number of pulses transmitted over lead 71 to the reflection-time selector exactly equals the number of milliseconds set on the dials 79, an impulse is transmitted over lead 77a to wavelet generator 76a to initiate the generation of wavelet #1. At this instant, wavelet generator 76a starts scanning the voltage function provided by generator 75, producing on the output lead 81a a voltage wave-form corresponding to the wave-form 24.

Generator 76a of reflection wave #1 has its output lead 81a connected to a control 82a where the wavelet amplitude and phase are modified in accordance with the reflection coefficient and phase of the first reflecting interface. The output lead 83a of control 82a extends to a summation circuit 84 wherein are summed all the voltages from similar controls 82, each corresponding to one of the received reflections. The output of summation circuit 84 is displayed by the pen recorder 85.

Figure 5:
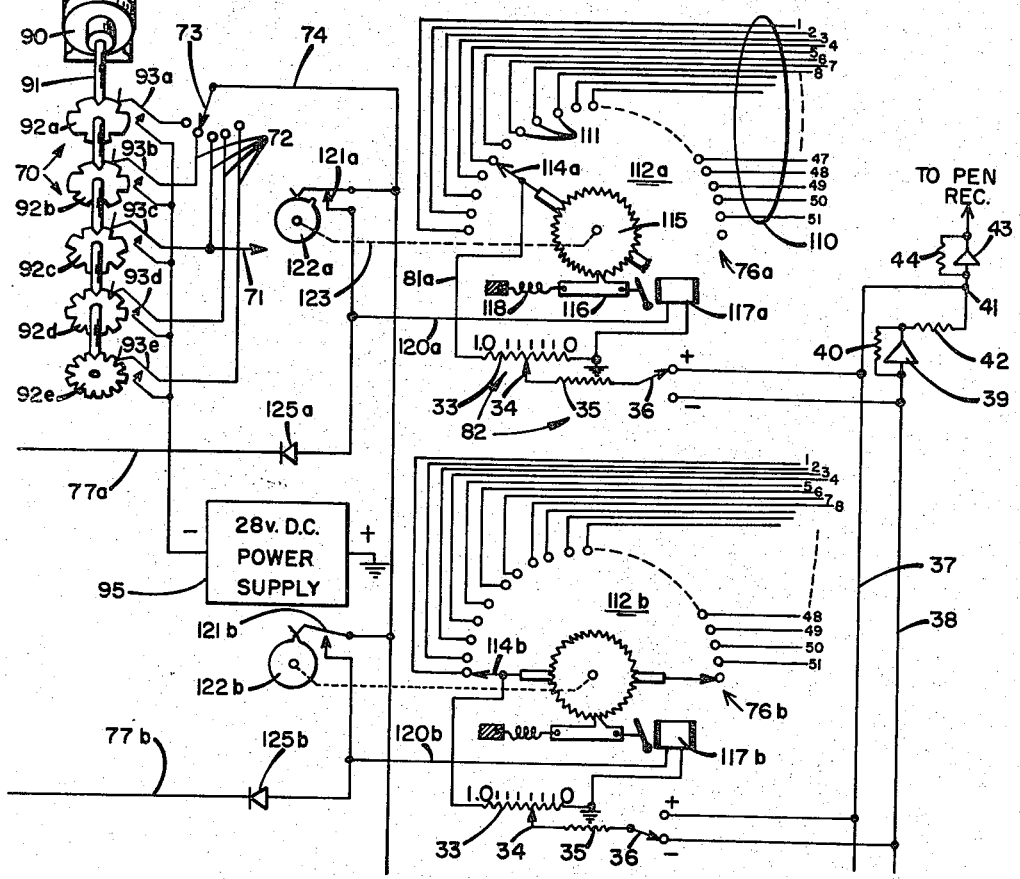
FIGURE 5 is a detailed wiring diagram of parts of a preferred form of wavelet generator.

The pulse generators 75 and wavelet generators 76 are shown in further detail in FIGURE 5. Thus, the pulse generators 70 preferably comprise a constant-speed or synchronous electric motor 89 which drives through reduction gearing 90 an output shaft 91 on which are mounted a plurality of cams 92a–92e. Each of the cams 92 has a different number of lobes and actuates one of a corresponding set of electrical circuit breakers 93a–93e. One terminal of each breaker 93 is connected in parallel with the corresponding terminal of the other breakers and to the negative pole of a power supply 95, which supplies a direct-current voltage of appropriate magnitude, such as 28 volts, for operation of the various relays employed throughout the circuit. Preferably, the positive terminal of power supply 95 is connected to electrical ground. The other terminal of each of the breakers 93 is connected to one of the leads 72 of selector switch 73, so that each point of the selector switch is supplied with interrupted or pulsating voltage of a different frequency. One of the intermediate frequencies, such as that supplied by the breaker 93c is chosen as the clock- or record-time frequency and applied also to the lead 71. Accordingly, it will be apparent that by varying the setting of contactor 73 of the selector switch, its output lead 74 is supplied with voltage pulses of a frequency less than, equal to, or greater than the record-time or clock-frequency impulses supplied over the lead 71.

Figure 6:
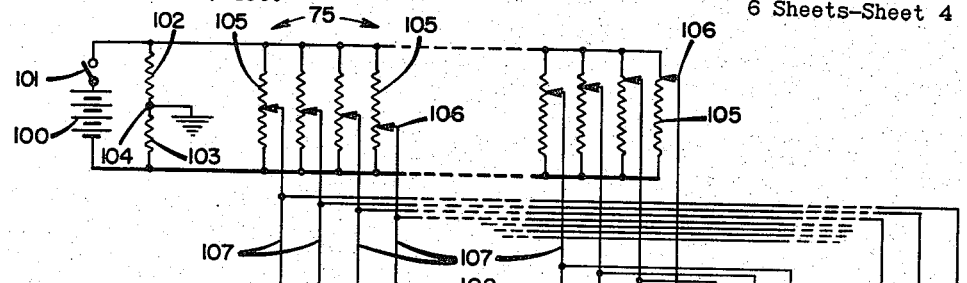
FIGURE 6 is a detailed wiring diagram of a function generator designed to cooperate with the apparatus of FIGURE 5.

A typical function generator 75 is shown in some detail in FIGURE 6. Thus, a direct-current voltage source, such as a battery 100 in series with a switch 101 is connected across a pair of series resistors 102 and 103 having their midpoint 104 connected to ground. Also connected across the switch and battery, in parallel with the resistors 102 and 103, are a plurality of potentiometers 105 having movable contactors 106. Each contactor 106 is connected by a corresponding output lead 107 to an output terminal 108, of which there are 51 in the example shown.

Figure 8:
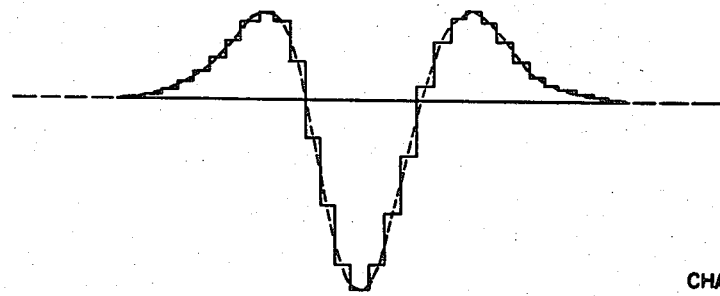
FIGURE 8 is a graph of the form of a typical wavelet generated by the apparatus of FIGURE 6.

In the general case, there are an equal number of potentiometers 105 and output terminals 108. Frequently, however, the generated function will be one which is symmetrical about its midpoint, and it is this type of function which is illustrated by FIGURE 6. Thus, terminal #26 corresponds to the function midpoint. Twenty-six potentiometers 105 and corresponding contactors 106 are accordingly able to generate the voltages required to approximate a 51-point function. That is, terminals #1 and #51 are interconnected, as are terminals #2 and #50, #3 and #49, and so on. The central portion of the voltage function is generated by interconnecting terminals #25 and #27, #24 and #28, and so on. Therefore, by proper adjustment of each contactor 106 on its corresponding potentiometer 105, a voltage step-function, such as is shown in FIGURE 8, can be obtained by scanning across the fifty-one output terminals 108 in sequence. Although this voltage function possesses the discrete steps illustrated by the solid-line graph of FIGURE 8, the effect of the pen recorder 85 is to substantially reduce these steps to a relatively smooth curve such as is illustrated by the dashed line of FIGURE 8.

Each of the fifty-one terminals of function generator 75 is connected by a lead in a cable 110 (FIGURE 5) to a corresponding point 111 in a 51-point step switch 112. In the embodiment of FIGURE 4 there are ten such step switches, each corresponding to one of the ten reflecting interfaces which can be modeled at one time without resetting the instrument adjustments.

The contacts 111 of step switch 112 are adapted to be contacted in sequence by the movable contactor 114 moved by a ratchet gear 115. Actuation of the gear 115 is by a pawl 116 which is drawn to the right by electric current through a solenoid 117 and urged to the left by a tension spring 118 when the current in solenoid 117 is interrupted. Electric current to actuate solenoid 117 and advance switch contactor 114 one switch point is supplied over a lead 120, the other lead of the solenoid 117 being connected to electrical ground. The electrical impulses to cause stepping of switch 112 are received from the output lead 74 of wavelet breadth selector switch 73 through a cam-operated switch 121 which is normally closed except for one position of the contactor 114. Switch 121 is operated by a single lobe on a cam 122 rotated in synchronism with the ratchet gear 115 by a mechanical connection 123. The energizing lead 120a of solenoid 117a is also connected through a diode 125a to the lead 77a by which an impulse can be transmitted from the selectors 79 representing the two-way travel-time of the first reflecting interface to be modeled. The polarity of diode 125a is such as to permit passage of an impulse from lead 77a to lead 120a but to prevent the impulses on lead 74 from passing backward over the lead 77a into the reflection-time selector 78.

A detailed wiring diagram of the reflection-time selector unit 78 is shown in FIGURE 7. Basically, this comprises three ten-point, relay-operated stepping or selector switches 130, 131, and 132. These three selector switches together provide 1000 different combinations of contact positions and thus are adapted to cover a record-time range from 0 to 999 milliseconds in one-millisecond steps. The *units* stepping switch 130 moves one contact position for each millisecond, the *tens* switch 131 moves one contact position for each ten milliseconds, and the *hundreds* switch 132 moves one contact position for each 100 milliseconds. Each of the switches 130, 131, and 132 resembles the 51-point stepping switches 112, except for having a lesser number of contact points. Thus, each of the ten contact points, numbered from 0 through 9, of each of the switches is adapted to be contacted in sequence by a movable contactor 134, carried by a ratchet gear 135, actuated by a pawl 136, which is moved alternately to the right and the left by a solenoid 137 and a tension spring 138, respectively.

It is of significance to note that in the operation of step switches 112 and also step switches 130, 131, and 132, the movement of the contactor 134 from one contact to the next does not occur upon the energizing of the solenoid 137 but rather when this solenoid is deenergized by the interruption of the applied voltage, at which time a movement of the contactor is produced by contraction of the tension spring 138. It may also be noted that corresponding parts of the different switches 130, 131, and 132 are designated respectively by the subscripts *a*, *b*, and *c*.

The manner in which the step switches 130, 131, and 132 advance one step at a time from position 0 to 999 will now be described. With switch 71a in lead 71 closed, and with motor 89 operating and thereby opening and closing breaker 93c at a rate determined by the rotation of cam 92c, pulses are applied from the power supply 95 to the actuating coil 137a of the units relay. It is assumed that contactors 134a, b, and c are all on contact "zero" at the beginning. Therefore, each interruption of the voltage on lead 71 causes the contactor 134a to advance one contact position in sequence. When contactor 134a reaches the #9 position, it closes the contacts of a relay 140 by applying voltage to it over the lead 141. This occurs upon the current interruption. When the contactor 93c next closes and applies voltage to coil 137a voltage is also applied through the closed contact of relay 140 to the coil 137b. Therefore, when the current is next interrupted, spring 138a advances contactor 134a from 9 to 0, while spring 138b advances contactor 134b from 0 to 1. When contactor 134a moves from 9 to 0, it breaks the circuit of lead 141 through the relay 140, and its switch contact is opened. With each succeeding pulse the contactor 134a continues to advance one step at a time across its contacts in succession. Upon reaching the #9 contact position a second time, relay 140 again closes and the next current impulse causes stepping of the contactor 134b from 1 to 2.

This same sequence is repeated until 99 current interruptions have caused contactors 134a and 134b both to reach the 9 position, whereupon contactor 134b applies voltage over a lead 143 to the coil of a relay 142 and connects both of stepping relays 137b and 137c to the source of clock pulses. Accordingly, when the next current interruption moves contactors 134a and 134b from 9 to 0, the same current interruption steps contactor 134c from 0 to 1. Thus, contactor 134c advances one contact position for each 100 clock pulses in the same way that the contactor 134b advances one position for each 10 clock pulses.

Each of the ten contact points of the *units* stepping switch 130 is connected to a corresponding contact point on a ten-position manual selector switch 79a, there being one additional manual selector switch exactly like 79a for each interface to be modeled. In this case for ten interfaces, ten decade selector switches corresponding to 79a are connected in parallel to the stepping-relay contacts 130. Likewise, each of the ten contact points of the *tens* stepping relay 131 is connected to a corresponding selector-switch point 79b, there being ten decade switches corresponding to 79b. Likewise, the contact points of *hundreds* step switch 132 are connected to corresponding contact points of ten decade selector switches 79c. By a lead 145, all of the movable contactors 134a, b and c of switches 130, 131, and 132 are connected in parallel and to the negative terminal of power supply 95.

The movable arm of each of the decade selector switches 79a, b, and c is connected to electrical ground through a separate relay coil 147, 148, or 149 respectively. The contacts of relays 147, 148, and 149 are all connected in series and placed between the clock pulse buss 71b, on which the pulses provided by interrupter 93c are present, and the reflection wavelet generator actuating lead 77a for the first reflecting interface. The movable arms of the various decade selector switches 79a, b, and c, are manually preset to a position equal numerically to the two-way reflection travel time to the interface being modeled. For example, it can be seen from the drawing that decade selector switches 79a, b, and c are set to a time of 037 milliseconds as the two-way travel time for the first interface, while decades 80a, b and c are set to a time of 178 milliseconds as the corresponding time for the second interface. Likewise, the third decade switches are set for a third reflection arrival time of 352 milliseconds. The decade switches of the tenth interface show a time setting for the two-way travel time to this interface to be 537 milliseconds.

In operation, it will be apparent that voltage from the power supply 95 will be applied through contactor 134a, b or c to the movable contactors of the decade switches 79a, b and c whenever the stepping-relay contacts are on the same switch points as the decade contactors. In other words, the closing of contactor 134a at switch position 8 applies voltage through decade selector 79a also on 8 to relay 147. Simultaneously, the contacting of contactor 134b with switch position 3 causes decade 74b to actuate relay 148. However, the fact that contactor 134c is on switch position 5 whereas 79c is on position 0 allows relay 149 to remain open, whereby the clock pulses on buss 71b are not transmitted to the lead 77a.

However, it will be observed that the decade-switch positions for the tenth reflecting interface are the same as the step-switch positions of switches 130, 131, and 132. Accordingly, all of the relays 150, 151, and 152 have closed contacts and one clock pulse from lead 71b is transmitted to the tenth wavelet generator actuating lead 77j. Likewise, at a previous time in the cycle, a clock pulse was transmitted to the #2 wavelet generator over lead 77b when the stepping-relay contacts 134a, b and c were on the relay positions 1, 7, and 8, 178 being the two-way travel time in milliseconds to the second reflecting interface.

Referring again to FIGURE 5, when an impulse is received over lead 77b and transmitted through diode 125b to stepping-relay coil 117b, step switch 112b makes its first step. This causes closing of the switch 121b by movement of the cam 122b and thereafter the function-scanning pulses on the lead 74 cause the contactor 114b to continue scanning through the 51 contacts on which the voltage function generated by generator 75 is present. In this way, each of the step switches 112 is caused to initiate its stepping action at the exact millisecond of record time preset on the decade selectors on the reflection-time selecting unit 78.

Depending upon where the wavelet breadth selector 73 is set, the function-scanning pulses on lead 74 occur more rapidly, at the same rate, or less rapidly than the record-time or clock pulses on the lead 71. Accordingly, the scanning of function generators 112 across the 51 switch contacts can be accomplished at any one of various speeds. In this way, the length of the input wavelet in terms of record-time milliseconds required for the complete stepping cycle of switches 112 can be varied by selector 73.

The voltage of each contactor 114a, 114b, etc. is transmitted to its respective reflection-coefficient potentiometer 33 and phase switch 36 and is summed by the same type of summation circuit as was described in detail for FIGURE 1, to provide a synthetic record trace recording by the pen recorder 85.

Figure 9:
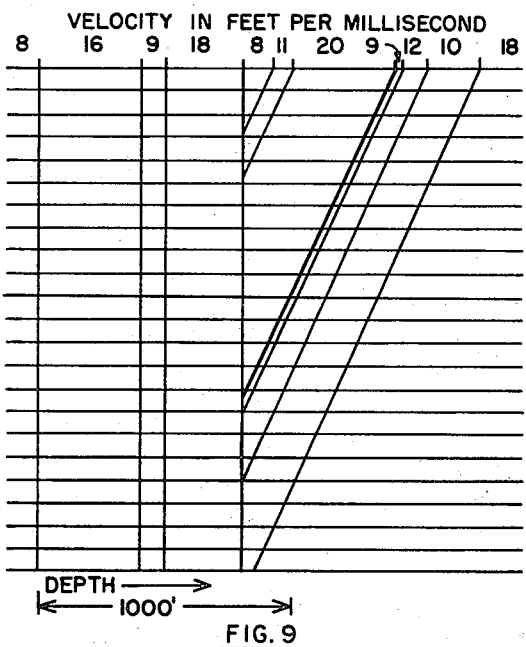
FIGURE 9 is an assumed configuration of subsurface reflecting interfaces for illustrating the mode of operation of the invention.
Figure 10:
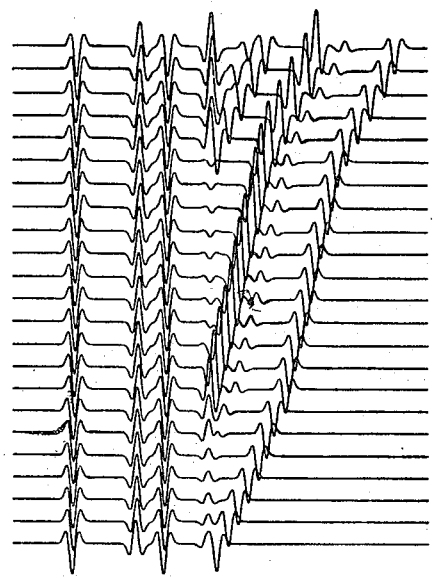
FIGURES 10, 11 and 12 are respectively the synthetic seismic records made by the apparatus of FIGURES 4–8 to represent the geologic section of FIGURE 9, utilizing different effective wavelet breadths.
Figure 11:
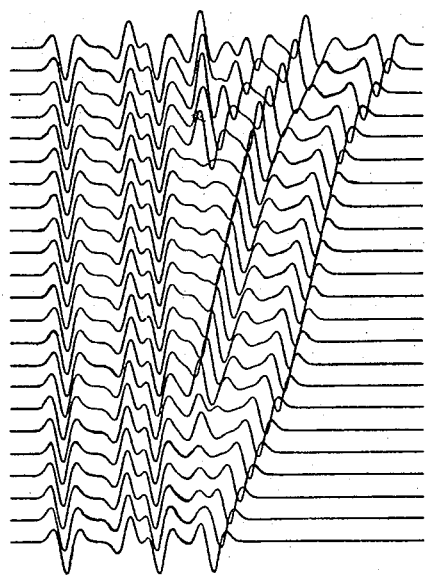
Figure 12:
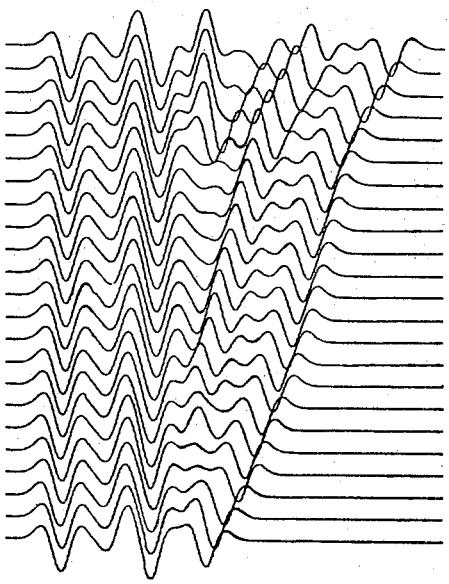

An example of synthetic seismic records computed by the apparatus of FIGURES 4 to 8 inclusive, is shown in FIGURES 10, 11, and 12. FIGURE 9 shows a hypothetical geological example assumed for illustration. It is a diagram of a number of subsurface reflecting interfaces turned on its side, so that depth proceeds from left to right rather than from top to bottom. At the bottom of the figure is shown the scale in feet to which the figure has been drawn. At the top is shown opposite each of the strata illustrated the velocity of seismic waves in the stratum in feet per millisecond. Typically, the velocities of 8, 9 and 10 feet per millisecond are shale strata, while the velocities of 11 and 12 feet per millisecond are sandstones, and those of 16, 18, and 20 feet per millisecond correspond to limestones. The geological situation illustrated is a truncation or pinchout in which lower-lying strata dipping at an angle from the horizontal are intersected by or terminate against upper, flat-lying strata.

FIGURE 10, correlated in position with the measurement section lines of FIGURE 9 shows the resulting synthetic seismic record, assuming a wavelet pulse breadth of 10 milliseconds.

FIGURE 11 is a synthetic record of the same geological example made with a pulse breadth twice that of FIGURE 10, namely, about 20 milliseconds. FIGURE 12 is the same as FIGURES 10 and 11 except that a relatively broad pulse of about 33 milliseconds effective breadth has been employed. These examples clearly illustrate the effects observed so often on seismic field records wherein an unavoidable broadening of the down-traveling seismic impulse causes overlapping of reflections from closely adjacent strata. A number of the individual pulses clearly visible in FIGURE 10 have completely lost their identity in FIGURE 12. Nevertheless, even the broad pulse forms of FIGURE 12 exhibit some changes in character which might aid an interpreter in understanding the geological situation.

In fact, the changes in character of a trace with pulse breadth are so marked that in an actual apparatus constructed in accordance with this invention, fifteen different pulse width varying from 10 to 40 milliseconds were provided. In this computer the ratio of the actual computer time to record time was made 200 to 1. In other words, the clock or record millisecond-time pulses were generated at the rate of 5 per second. Thus, the synthetic record trace was generated at the rate of 300 milliseconds of record time per minute of computer time, so that a one-second record trace required only 3⅓ minutes to be run completely.

Most records involving ten interfaces, however, occupy much less than one second of seismic record time. Accordingly, a synthetic trace is completed before step switches 130, 131, and 132 have advanced through their 999 steps. In operation, therefore, when the desired portion of the trace has been completed, the stepping of the switches is stopped by opening switch 71a. In order to return the contactors 134a, b and c to their zero positions, each of these switches is provided with leads and a push button 150 by which a voltage impulse can be applied directly from power supply 95 to the actuating solenoid 137a, b or c. Accordingly, by manually pulsing these solenoids with the appropriate push button 150, each contactor 134a, b or c can be advanced to its zero position and thereby reset for making a new synthetic trace.

It should be understood that the showing of a ten-interface computer is only by way of example, and further that any number of interfaces greater than ten can be modeled by successive runs, each run producing the trace for a group of ten successive interfaces, the machine then being reset for the next group of ten, and so on. The traces for successive runs can be added graphically to obtain the final trace; or if storage in electrically reproducible form is available, such as by a multi-trace magnetic recorder, the run traces can be played back and electrically added for the final presentation.

It should also be noted that after any 51-point wavelet generator 112 has completed its stepping cycle, it and its associated reflection coefficient and phase controls are available for resetting to model any deeper interface, provided its starting time has not been passed by the time stepping switches 130, 131, and 132. Thus, by interrupting both the timing pulses on lead 71 and scanning pulses on lead 74 simultaneously during a run, data on additional interfaces can be set into part of the wavelet generators 76 before the rest of them have completed their scanning cycles. Thus, additional interfaces can be combined properly with those initially set up.

While the invention has been described by reference to the foregoing embodiments, modifications, and examples, it is to be understood that still other and further embodiments and modifications will be apparent to those skilled in the art. The invention therefore should not be considered as limited to the details described, but it is properly to be ascertained by reference to the appended claims.

We claim:

1. A seismic analog record computer comprising a wavelet generator including at least one electrically conductive element and a direct-current voltage source connected so thereto that the voltage continuously present thereon varies along the length of said element as the assumed wave-form of a seismic reflection wavelet, a plurality of contactors each adapted to contact said element and by scanning along it to derive said voltage waveform directly therefrom, means to produce scanning of said element by said contactors in sequence with spacings proportional to the two-way seismic reflection travel times to a corresponding plurality of subsurface seismic-wave-reflecting interfaces, means connected to each of said contactors for modifying the amplitude of the voltage derived by it from said element in dependence upon the reflection coefficient of the corresponding one of said interfaces, means connected to said modifying means for summing all of said contactor voltages so modified and with phases corresponding to the polarities of the corresponding reflected seismic wavelets, and means connected to said summing means for recording the output of said summing means as a function of time.

2. A seismic analog record computer as in claim 1 in which said element is the fixed-contact array of a plurality of multiple-contact step switches, and including means to initiate the stepping of the movable contactor of each of said step switches at a time in the operating cycle of said computer proportional to one of a plurality of corresponding two-way seismic reflection travel times to a plurality of subsurface seismic-wave-reflecting interfaces.

3. A seismic analog record computer as in claim 1 in which said element is an electrical resistance, and including a scale of two-way seismic reflection travel times adjacent which said contactors are spaced in proportion to the travel times to a corresponding succession of subsurface seismic-wave-reflecting interfaces.

4. A seismic analog record computer as in claim 1 in which said element is an electrical resistance wire wound with variable spacing on a card of substantially constant width, and electrical leads including variable resistors connecting points of said wire to the positive and negative terminals of said voltage source, said variable spacing and said variable resistors being arranged and adjusted to produce a voltage varying as said wave-form on a contactor scanning said wire along the length of said card.

5. A seismic analog record computer as in claim 1 in which said element is a card having a plurality of closely spaced, insulated, parallel wires exposed on its surface and adapted to be contacted by said contactors, a flexible lead extending from each of said wires to a point on a wave-form voltage source along the length of which the voltage varies as the wave-form of a seismic reflection wavelet, and means for varying the number of said parallel wires to which said wave-form voltage is applied to vary the effective wavelet breadth.

6. A seismic analog record computer as in claim 1 in which said element is an electrical resistance wire wound with substantially constant spacing on a card of variable width, and electrical leads at least some of which include variable resistors connected between said wire at points of minimum width of said card and the positive and negative terminals of said voltage source, said variable width and said variable resistors being arranged and adjusted to produce a voltage varying as said wave-form on a contactor scanning said wire along the length of said card.

7. A seismic analog record computer comprising a wavelet function generator including a direct-current voltage source connected to at least one electrically conductive element along the length of which the voltage is continuously present and varies as the assumed wave-form of a seismic reflection wavelet, a plurality of contactors each adapted to contact and scan the length of said element and derive directly therefrom said voltage wave-form, means for producing relative motion of said element and said contactors, means for positioning each of said contactors relatively along a time scale at a point proportional to the two-way seismic-wave travel time to a corresponding subsurface seismic-wave-reflecting interface, means connected to each of said contactors for modifying the voltage wave-form derived by said each contactor from said element in proportion to the reflection coefficient of the corresponding subsurface reflecting interface, means for summing the modified voltages of all of said contactors with positive or negative phase in accordance with the phase of the corresponding subsurface seismic reflection, and a recorder connected to said summing means for recording the output thereof as a function of time.

8. A seismic analog record computer comprising an elongated electrical resistance element, a source of direct-current potential, a plurality of leads extending between said source and a plurality of points spaced along said element, means in said leads for varying the current-flow pattern in said element to produce a potential continuously present on and varying along the length of said element as the assumed wave-form of a seismic reflection wavelet, a plurality of movable contactors each for making contact with a point of said element to derive the potential present at said point, a time-scale, means for positioning said contactors at positions along said scale corresponding to the two-way seismic-wave travel times to a corresponding plurality of subsurface reflecting interfaces in the earth, a plurality of voltage dividers each connected to one of said contactors, means for inverting the phase of the output voltage of each of said dividers relative to the phase of any others of said dividers, means for summing in the proper phase all of the outputs of said voltage dividers, means for traversing said resistance element past said contactors to transfer said potential wave-form directly to each of said contactors in sequence, and means for recording the output of said summing means as a function of position of said element during the traversing thereof past said contactors.

9. A seismic analog record computer comprising a generator of record-time unit pulses, a reflection-time-selecting circuit connected to said generator and actuated by said pulses adapted to select those of said pulses corresponding to the two-way seismic wave travel times to each of a plurality of successive subsurface seismic-wave-reflecting interfaces, a wave-form voltage-function generator adapted to produce a voltage varying in correspondence to an assumed seismic reflection wavelet on a contactor scanning across the output of said generator, a plurality of wavelet generators each adapted to be triggered by a corresponding of said selected pulses and having a contactor adapted thereafter to scan scross the output of said function generator at a constant rate, means for varying the output voltage detected by said contactor of each of said wavelet generators in accordance with the reflection coefficient of the corresponding subsurface reflecting interface, means connected to the output of said wavelet generators to sum the outputs of all of said voltage-varying means with phases corresponding to the corresponding subsurface seismic reflection phases, and means connected to said summing means for recording a trace indicating the variations of said sum as a function of record time.

10. A seismic analog record computer as in claim 9, including also means for selecting different values for said constant rate, whereby the effective wavelet breadth of the wavelet outputs of said wavelet generators may be varied.

11. A seismic analog record computer comprising elongated means along the length of which a voltage, continuously present thereon, varies as the assumed wave-form of a seismic reflection wavelet, a plurality of means each for contacting said elongated means at a point along its length for deriving directly from it the voltage value present at said point, means for spacing said plurality of contacting means from each other by intervals proportional to seismic two-way travel times to a corresponding plurality of subsurface interfaces, means acting on at least one of said elongated means and said plurality of contacting means to cause said point for each of said contacting means to move along the length of said elongated means, whereby the voltage derived by said each contacting means varies as said wave-form, a plurality of adjusting means each connected to one of said contacting means for adjusting the amplitude of said derived voltage and for inverting its polarity, means connected to said adjusting means for combining said derived voltages as modified by said adjusting means into a single resultant voltage, and means connected to said combining means for recording said resultant voltage as a function of seismic-wave travel time.

References Cited in the file of this patent

UNITED STATES PATENTS

| | | |
|---|---|---|
| 2,114,330 | Borden | Apr. 19, 1938 |
| 2,836,359 | Mazzagatti | May 27, 1958 |
| 2,866,596 | Hoefs et al. | Dec. 30, 1958 |
| 2,896,082 | Raymond et al. | July 21, 1959 |
| 2,908,889 | Piety | Oct. 13, 1959 |
| 2,928,604 | Dudman et al. | Mar. 15, 1960 |
| 2,933,254 | Goldberg et al. | Apr. 19, 1960 |
| 2,964,240 | Brinster et al. | Dec. 13, 1960 |